United States Patent Office 3,107,650
Patented Oct. 22, 1963

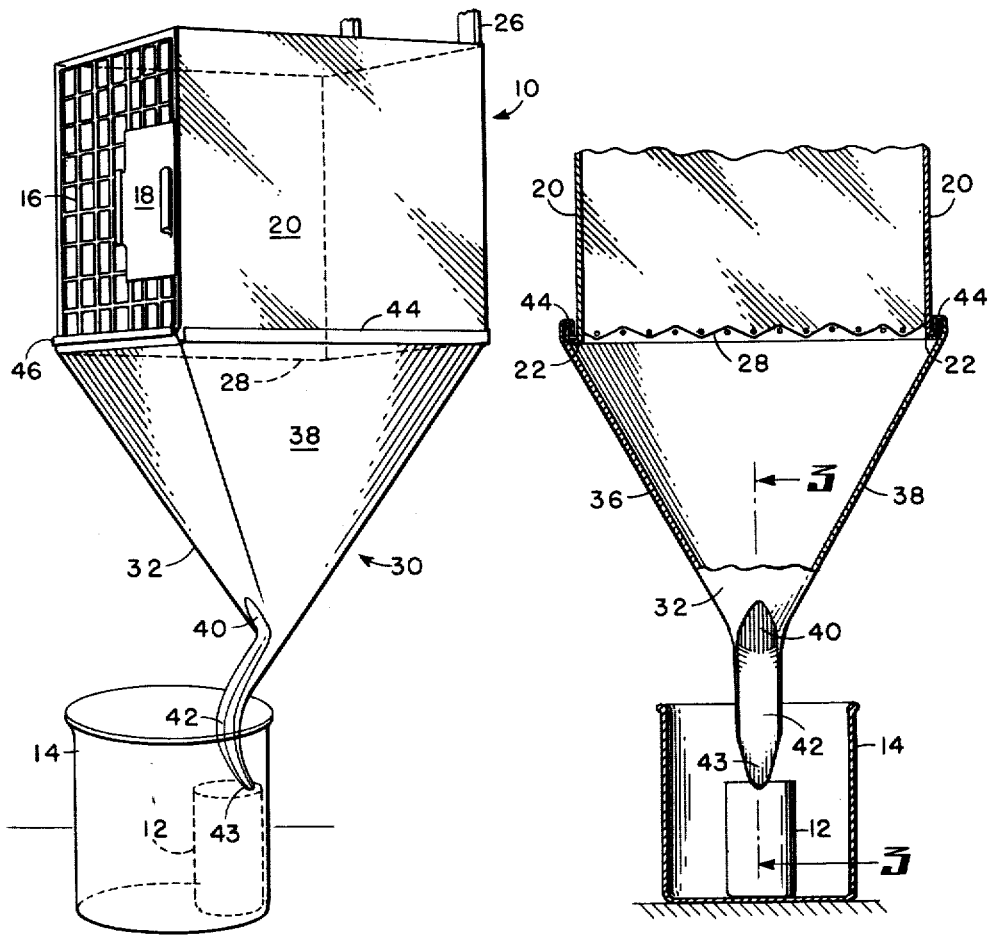
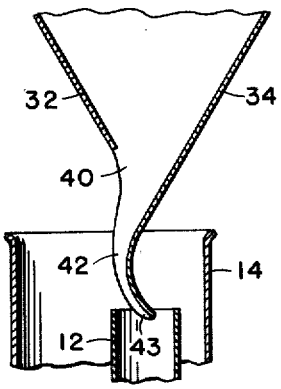

3,107,650
APPARATUS FOR MAINTAINING SEPARATED THE URINE AND FECES SPECIMENS OF CAGED LABORATORY ANIMALS
Jules S. Cass, Cincinnati, Ohio
(1513 Sanford Road, Silver Spring, Md.)
Filed Apr. 23, 1962, Ser. No. 189,541
3 Claims. (Cl. 119—17)

This invention relates to apparatus for housing and testing laboratory animals such as mice, rats, guinea pigs, rabbits, and other animals whose feces are formed, and more particularly to apparatus for housing laboratory animals and for automatically maintaining separated the urine and feces specimens of the animals.

The laboratory animal has been found to be one of the most useful tools of medical scientists in diagnosing the causes of various diseases and in the discovery of cures by observing the various reactions on the animals of particular treatments and drugs. One of the standard techniques employed is the analysis of the animal's urine and feces. However, a common problem has been the reduced usefulness of the specimens by the mutual contamination of the feces and the urine, and in the loss of urine volume due to evaporation.

The prior art has contrived several techniques for separating urine and feces specimens, but each of these techniques has suffered from various shortcomings. The most commonly used technique involves the use of a funnel mounted below a coarse wire mesh cage having openings large enough to pass the eliminated formed feces along with the urine. The funnel is provided with a fine wire mesh capable of trapping the formed feces while at the same time passing the urine. This system has several disadvantages, the most serious of which is that the subsequent elimination of urine will flow over trapped feces and thus there is the ever-present hazard of mutual contamination which this invention seeks to avoid. Moreover, there is a substantial loss in urine volume due to presence of additional surfaces for evaporation provided by the fine mesh of the feces trap.

In another prior-art arrangement, a funnel mounted below a coarse wire mesh cage carries both the urine and the feces towards a jar in the narrow mouth of which is positioned a drop-shaped glass bulb. Formed feces impinging on the glass drop are deflected from the jar, while the urine adheres to the glass and is fed by gravity into the jar. This system has proved somewhat effective, but it suffers from the disadvantages of requiring a plurality of relatively precision-made parts. The relative positions of the end of the funnel, the glass drop, and the mouth of the jar must be critically maintained to obtain satisfactory performance; and furthermore, both the urine and the feces are directed onto a small surface area, and hence mutual contamination is almost inevitable.

In accordance with this invention, I provide a device which is constructed of no moving parts, which is simple and inexpensive to build, which permits widely varying tolerances in manufacture, and which reduces the possibilities of contamination.

It is the object of this invention to provide laboratory apparatus for housing an animal and for maintaining separated the eliminated urine and feces specimens of the animal to reduce, or avoid, the mutual contamination of the specimens, and to reduce losses of urine due to evaporation.

Another object of this invention is to provide laboratory apparatus for housing an animal and for automatically maintaining the eliminated urine and feces specimens separated without moving parts, or parts requiring critical tolerances in manufacture, or critical adjustment in use.

Another object of this invention is to provide apparatus for maintaining separated the eliminated urine and formed feces specimens of caged laboratory animals, said apparatus including a conveyor having an inclined surface terminating in a convex surface.

Still another object of this invention is to provide laboratory apparatus for automatically maintaining eliminated urine and formed feces specimens separated, said apparatus comprising a unitary conveyor having an inclined surface terminating in a convex surface.

Another object of this invention is to provide a housing for a small laboratory animal, said housing having a coarse wire mesh floor, a funnel-shaped conveyor mounted below the floor, said funnel being constructed with an inclined surface terminating in a convex surface, whereby eliminated formed feces rolling down said inclined surfaces are propelled tangentially from the conveyor at said convex surfaces but eliminated urine adheres and coheres to the convex surface.

Still another object of this invention is to provide a urine-feces separator, constructed in one piece, with no moving parts, which requires no critical tolerances and which is simple and inexpensive to manufacture and use.

Briefly described, this invention contemplates the use of a cage for housing a small laboratory animal, such as a rat, guinea pig, or other small animal, whose eliminated feces are formed pellets. The cage is provided with a coarse wire mesh floor, the dimensions of which are not critical except that the mesh must be small enough to contain the animal comfortably, while permitting the substantially uninhibited passage of eliminated feces. A funnel-shaped conveyor, having flat inclined conveying surfaces terminating in a convex separating surface is mounted below the floor of the cage. The dimensions of the mouth of the funnel-shaped conveyor are at least as large as the floor of the cage so as to intercept all eliminated urine and feces. The flat inclined conveyor surfaces are in the form of a truncated pyramid, but may be conical, or any other suitable shape, terminating in a convex surface at the apex. All excreta is carried by gravity down the walls of the inclined surfaces to the convex surface at the apex. If the slope of the inclined surfaces is sufficient, the feces pellets will have gathered sufficient speed in the fall down the conveyor wall surfaces and will be projected tangentially from the convex surface into one container. Eliminated urine, on the other hand, adheres to the convex surface and is directed into another container, thus maintaining the urine separate from the feces.

For other objects and for a more complete understanding of this invention, reference should now be made to the following specification and to the accompanying drawings, in which:

FIG. 1 is a perspective view of a funnel-shaped embodiment of this invention;

FIG. 2 is a front view partly in section of the embodiment shown in FIG. 1; and

FIG. 3 is a cross-sectional view taken through the line 3—3 in FIG. 2.

Referring to the drawing, there is illustrated a cage 10 for housing a small laboratory animal whose urine and feces specimens are to be collected in a test tube 12 and in a jar 14. The cage 10 is relatively conventional, constructed of a combination of sheet metal and wire mesh walls suitable for confining an animal. The front wall 16 is preferably constructed of wire mesh and is provided with a small hinged door 18 for permitting access to the cage interior. The side walls 20, made of sheet metal, are each provided with a bottom turned lip 22 for a purpose hereinafter to be explained. The rear wall 24 is provided with a pair of brackets 26 (shown broken away) for supporting the cage 10 in the attitude shown. The bottom wall, or floor, 28 is costructed of wire mesh having dimensions providing openings which are fine enough to confine an animal comfortably but coarse enough to permit uninhibited passage therethrough of the largest sized feces pellets expected.

The funnel-shaped feces-urine conveyor provided by this invention is generally indicated at 30, and is shown supported from the turned lips 22 at the bottom of the walls 20 of the cage. The construction provides that eliminated feces passing through the floor 28 be conveyed by gravity down the walls of the conveyor and propelled into the jar 14, while eliminated urine flows by gravity down the walls of the conveyor and is directed into the test tube 12. The conveyor 30 is pyramidal in shape, having four conveying walls or surfaces 32, 34, 36, and 38, all converging toward an apical opening 40 and terminating in a concave-convex extension 42.

The upper edges of the surfaces 36 and 38 are each provided with turned lips 44 arranged for mating in sliding support relationship with the lips 22. The upper edge of the surface 32 is provided with an extension 46 which provides a positive stop for the sliding engagement between the cage 10 and the conveyor 30.

The dimensions of the conveyor are such that the uppermost portion, the mouth of the funnel, underlies the entire mesh floor 28 so as to capture all excrement from an animal housed within the cage. The height of the conveyor must be such as to provide a relatively steep slope for the surfaces of the walls 32, 34, 36, and 38, thereby permitting acceleration of the excrement to speeds which will be sufficient for the purpose of maintaining the urine and feces specimens separated, in a manner hereinafter to be explained.

As illustrated, the extension 42 at the opening 40 is actually an extension of the surface 34 and portions of the surfaces 36 and 38. The extension 42 is convex in the direction of flow of the excrement, but is concave in the direction transverse to the flow. As will be seen, the concave-convex arrangement of the extension serves to restrain the transverse flow of the excrement while permitting the maintenance of separation of the solid formed feces from the urine. It will also be observed that the extension 42 completely underlies the apical opening 40 in a vertical direction so that no excrement will fall through the apical opening 40 without striking the extension. It will also be observed that the apical opening 40 has been made oblique so as to provide for the rapid flow of urine down one edge or the other surrounding the opening, thus avoiding the prolonged suspension of droplets at the opening and thus avoiding unnecessary evaporation.

In operation, all excrement from a caged animal falls upon one or another of the conveying surfaces 32, 34, 36, or 38 and flows through the opening 40 at the apex.

The urine flows downward on the conveying surfaces, around the edges of the apical opening 40 and onto the extension 42. The urine flows down the extension 42, and by adhesion and cohesion flows around the convex portion of the surface and over the blunted tip 43 and into the test tube 12. On the other hand, pellets of formed feces which roll down the conveying surfaces and pass through the apical opening 40, are propelled tangentially from the extension 42 into the jar 14. Thus, using the same conveying surfaces with no moving parts, the urine is directed by cohesion and adhesion into one vessel, while the feces are propelled tangentially into another vessel, thereby maintaining the specimens separated.

The conveyor 30 must be constructed of chemical-impervious and non-absorptive materials. In the illustrated embodiment, sheet metal is used. However, plastic, glass, fiber glass, or even paper of some types, may be used. Also, while the conveyor 30 has been illustrated as a truncated pyramid, it is clear that a cone may also have been used with appropriate modifications for mounting below the cage 10. That is to say, the shape of the conveyor is not limited to the embodiment illustrated, but need only be provided with a conveying surface or surfaces which totally underlie the wire mesh floor 28 of the cage and which are provided with a slope sufficient to achieve the necessary velocity to tangentially propel the feces from the surface, while at the same time permitting cohesion and adhesion of the urine.

Moreover, the cage may be made integral with the conveyor, or the conveyor alone may provide both the function of housing the animal and maintaining the required separation. That is to say, the cage 10 may be eliminated entirely, and a wire mesh floor be positioned horizontally below the mouth of the funnel-shaped conveyor 30, and an appropriate lid be placed over the mouth. Further, the floor of the cage need not be made of wire mesh, but may be constructed of any chemically impervious material that will resist animal destruction.

In addition, many other modifications and adaptations will at once become apparent to persons skilled in the art. It is intended, therefore, that this invention be limited only by the annexed claims and interpreted in the light of the prior art.

I claim:

1. In apparatus for maintaining separated the urine and feces excrement of animals whose feces are formed pellets, said apparatus including
   a cage for confining said animal;
   said cage including a horizontal animal-supporting mesh floor, the openings in said animal-supporting mesh floor having dimensions small enough to support said animal but large enough to permit the passage therethrough of said formed feces pellets;
   the improvement comprising:
   a funnel-shaped conveyor supported below said floor, said funnel-shaped conveyor having a mouth underlying the entire area of said animal supporting mesh floor and having an oblique apical opening at its apex, said funnel-shaped conveyor being made of a material impervious to said feces and urine excrement;
   said funnel-shaped conveying surfaces terminating at said oblique apical opening in a trough-like extension, the conveying surface of said trough-like extension being convex in the direction of flow of excrement, and entirely underlying the downward direction of said oblique apical opening;
   the slope and length of said funnel-shaped conveying surfaces being such as to permit said feces pellets and said urine to achieve a velocity such that said pellets are propelled tangentially from the convex surface of said trough-like extension while the urine adheres and coheres to the surface of said trough-like extension and is propelled in another direction from the end of said extension.

2. The invention as defined in claim 1 wherein said conveyor is in the form of a pyramid-shaped funnel.

3. The invention as defined in claim 2 wherein said means for confining said animal is a cage provided with a plurality of walls, of which two opposed walls are each provided with a turned lip on the bottom edge thereof; said pyramid-shaped funnel conveyor having corresponding turned lips on the upper edges thereof, said turned lips on said cage slidably mating with said turned lips on said pyramid-shaped funnel conveyor for slidably supporting said conveyor from said cage.

References Cited in the file of this patent

UNITED STATES PATENTS

| | | |
|---|---|---|
| 2,524,229 | Krueger | Oct. 3, 1950 |
| 2,684,051 | Leblond | July 20, 1954 |
| 3,018,760 | Tate | Jan. 30, 1962 |

UNITED STATES PATENT OFFICE
CERTIFICATE OF CORRECTION

Patent No. 3,107,650                October 22, 1963

Jules S. Cass

It is hereby certified that error appears in the above numbered patent requiring correction and that the said Letters Patent should read as corrected below.

Column 3, line 21, for "costructed" read -- constructed --; column 4, lines 68 and 69, for "direction" read -- projection --.

Signed and sealed this 14th day of April 1964.

(SEAL)
Attest:

ERNEST W. SWIDER

Attesting Officer

EDWARD J. BRENNER

Commissioner of Patents